United States Patent

Goode

[11] Patent Number: 5,018,703
[45] Date of Patent: May 28, 1991

[54] VALVE DESIGN TO REDUCE CAVITATION AND NOISE

[75] Inventor: William B. Goode, Dallas, Tex.

[73] Assignee: Teledyne Industries, Inc., Dallas, Tex.

[21] Appl. No.: 371,201

[22] Filed: Jun. 26, 1989

Related U.S. Application Data

[62] Division of Ser. No. 143,980, Jan. 14, 1988, Pat. No. 4,860,993.

[51] Int. Cl.$^5$ .............................................. F16K 47/08
[52] U.S. Cl. ..................................... 251/127; 251/118; 137/625.3; 137/625.37
[58] Field of Search ....................... 251/127, 118, 123; 137/625.3, 625.37

[56] References Cited

U.S. PATENT DOCUMENTS

| | | | |
|---|---|---|---|
| 2,649,273 | 8/1953 | Honegger | 251/118 X |
| 4,162,784 | 7/1979 | Legille et al. | 251/127 X |
| 4,506,860 | 3/1985 | Schwerdtner et al. | 251/118 X |
| 4,567,915 | 2/1986 | Bates et al. | 251/127 X |
| 4,650,155 | 3/1987 | Liantonio | 251/118 |

Primary Examiner—Arnold Rosenthal
Attorney, Agent, or Firm—Crutsinger & Booth

[57] ABSTRACT

A valve comprising a valve body (10) having inlet (14) and outlet (18) passages communicating with a valve chamber (15). A valve element (90) is movable through the valve chamber adjacent a valve seat (92) and a flow deflector ring (104) having a central opening which has discontinuous deflector surfaces (106) around a central opening separated by spaced grooves (108) arranger to disrupt flow a stream of fluid flowing between the valve element and the valve seat to prevent the formation of a vena contracta downstream from the valve seat. A plurality of sleeves (34,36) having cylindrical walls divide the valve chamber to form an entrance section (15a) and an outlet section (15b). An array of inlet bores (38) is formed in an outer sleeve (34) and an array of exit bores (40) is formed in an inner sleeve (36), each of the bores having a receiving end and a discharge end, receiving ends of bores in the array of outlet bores being spaced axially of the valve chamber relative to discharge ends of bores in the array of inlet bores. Bores in the array of inlet bores are inclined relative to bores of the array of exit bores to form a tortuous flow path from the inlet section through a plurality of axially spaced plenums (44,46,48) to the outlet section 15b) of the valve chamber (15) to minimize noise and cavitation as pressure is reduced in the valve chamber.

12 Claims, 5 Drawing Sheets

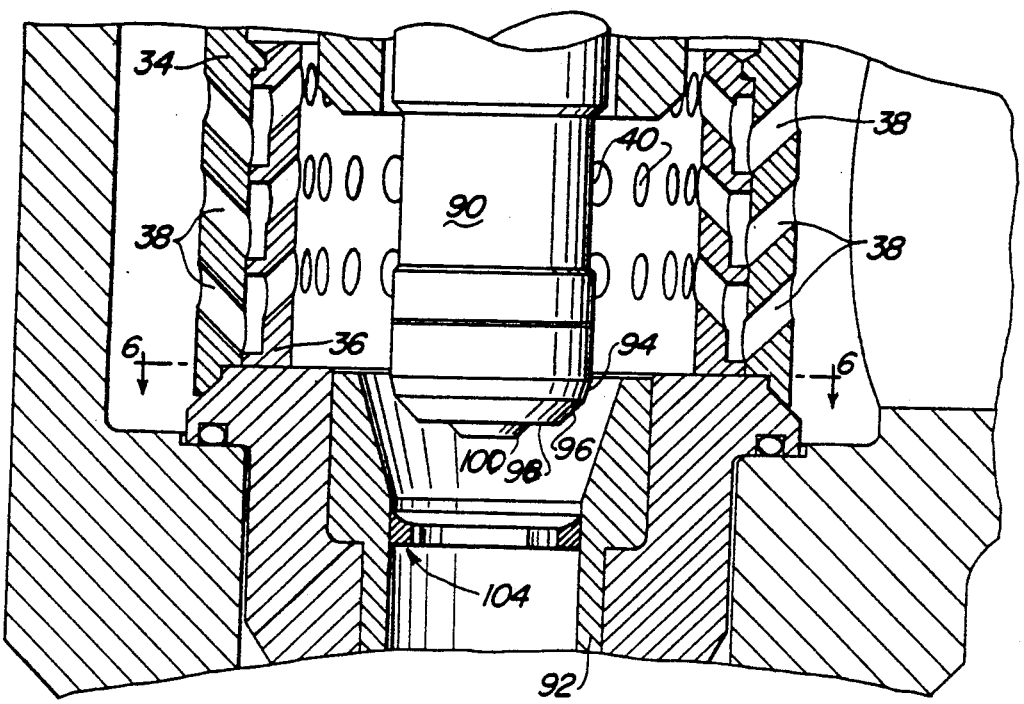
FIG. 5
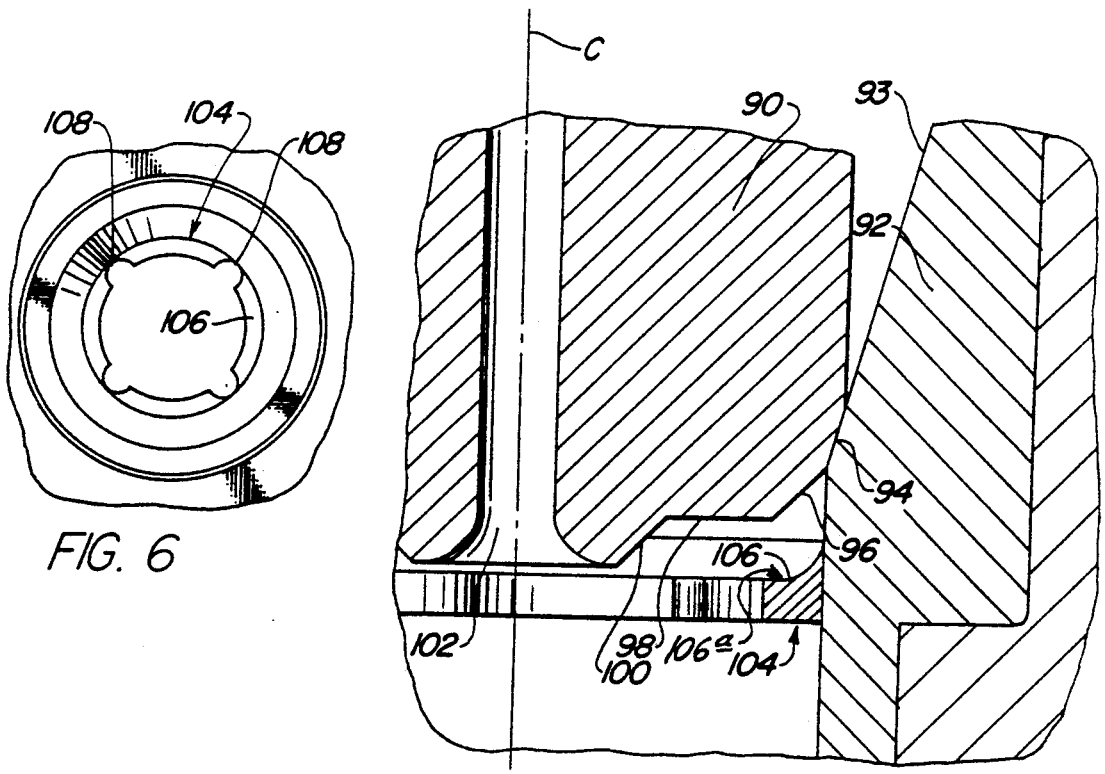
FIG. 6
FIG. 7

VALVE DESIGN TO REDUCE CAVITATION AND NOISE

This is a division of application Ser. No. 07/143,980 filed Jan. 14, 1988, now U.S. Pat. No. 4,860,993.

BACKGROUND OF THE INVENTION

1. Field of the Invention

This invention relates to valve designs to reduce noise and erosion caused by flow through a valve.

2. Description of the Prior Art

High flow rates and pressures in flow control valves create noise problems and cavitation induced erosion damage. Cylindrical cages have been used in valves to reduce noise and cavitation induced erosion. These designs require that the sleeves be designed to fit a particular flow condition.

Valve trim designs to reduce cavitation are disclosed in ISA HANDBOOK OF CONTROL VALVES, 2d Ed, 1976 Instrument Society of America. Design criteria dictate that the pressure drop in the valve not exceed the vapor pressure of the fluid. The application of general valve design criteria to a specific valve appeared in an article entitled "Prudhoe Challenges New Choke-Valve Design" printed at page 92 of Oil & Gas Journal, Apr. 1, 1985.

Noise reduction has not been achieved to desired levels in valve designs which stress reduction of cavitation.

SUMMARY OR THE INVENTION

The valve disclosed and illustrated herein incorporates an improved cage design in which the flow characteristics of the cage can he adjusted when the valve is assembled or by replacing cages if necessary. In addition, the cage design uses axially spaced sets of ports interconnected by plenums to direct multiple flow streams through a series of changes of direction to reduce the velocity and pressure of the fluid. The cage design which causes multiple changes in flow direction is particularly effective when used in combination with a valve seat flow deflector to reduce swirl of the pressure regulated flow stream from the valve.

The valve design generally comprises a valve body having inlet and outlet passages communicating with a valve chamber A plurality of sleeves, having cylindrical walls, are mounted in the valve chamber and divide the chamber to form an entrance section and an outlet section. Spacers between walls of the sleeves space them apart radially to form an annular plenum between adjacent cylindrical walls of the sleeves.

An array of inlet bores is formed in an outer sleeve and an array of exit bores is formed in an inner sleeve, each of the bores having an a receiving end and a discharge nd. Receiving ends of bores in the array of outlet bores is spaced axially of the valve chamber relative to discharge ends of bores in the array of inlet bores. Further, bores in the array of inlet bores are inclined relative to bores of the array of exit bores to form a tortuous flow path from the inlet section through the plenum to the outlet section of the valve chamber. Fluid flowing through array of bores impinges against walls of the plenum to change the direction of flow in a plurality of directions. Flow is diverted and forced both longitudinally and circumferentially of the annular plenum in route to the next array of bores.

A valve seat in the outlet passage of the valve and a cylindrical valve element are provided with surfaces which cooperate with a flow deflector ring, having discontinuous deflector surfaces separated by spaced grooves, to disrupt flow of a stream of fluid flowing between the valve element and the valve seat.

DESCRIPTION OF THE DRAWING

The advantages and features of the present invention can be better understood by referring to the following detailed description as more fully understood by reference to the attached drawings, in which:

FIG. 5 illustrates the embodiment of FIG. 2 in combination with an alternate valve seat design;

FIG. 6 is a sectional view taken on Line 6—6 of FIG. 5 looking in the direction of the arrows; and FIG. 7 is an enlarged sectional view similar to FIG. 5 showing the valve in a closed position In these drawings, like reference characters are utilized to designate like corresponding parts throughout the various figures appended hereto.

DESCRIPTION OF PREFERRED EMBODIMENTS

Figure 1:
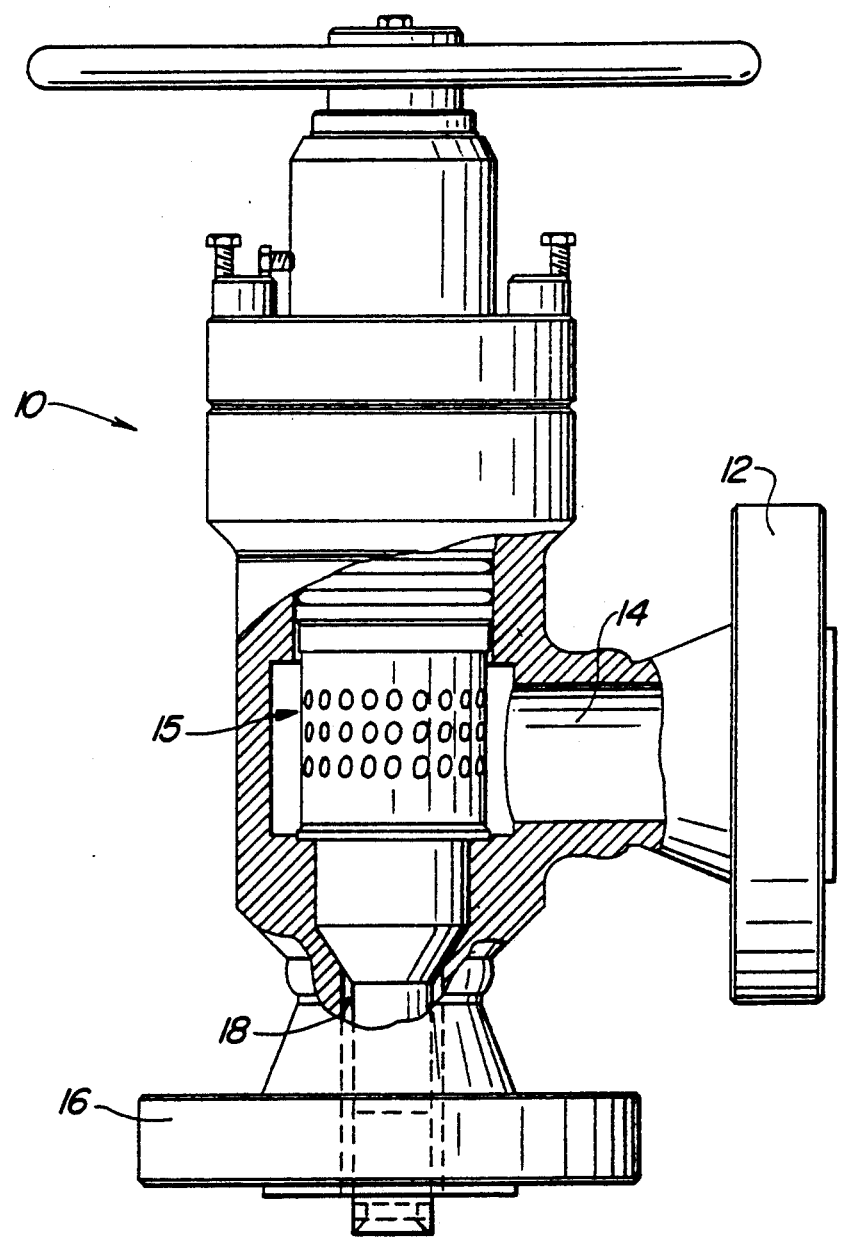
FIG. 1 is an elevational view partially in section of a valve incorporating the improved design of the present invention.

Referring initially to FIG. 1, there is illustrated a valve 10 incorporating the improvement of the present invention. Valve 10 has a flange type inlet connector 12, an inlet passageway 14, an outlet connector 16 and outlet passageway 18. Flow of fluid from inlet 14 to outlet 18 can be controlled by the valve 10.

Figure 2:
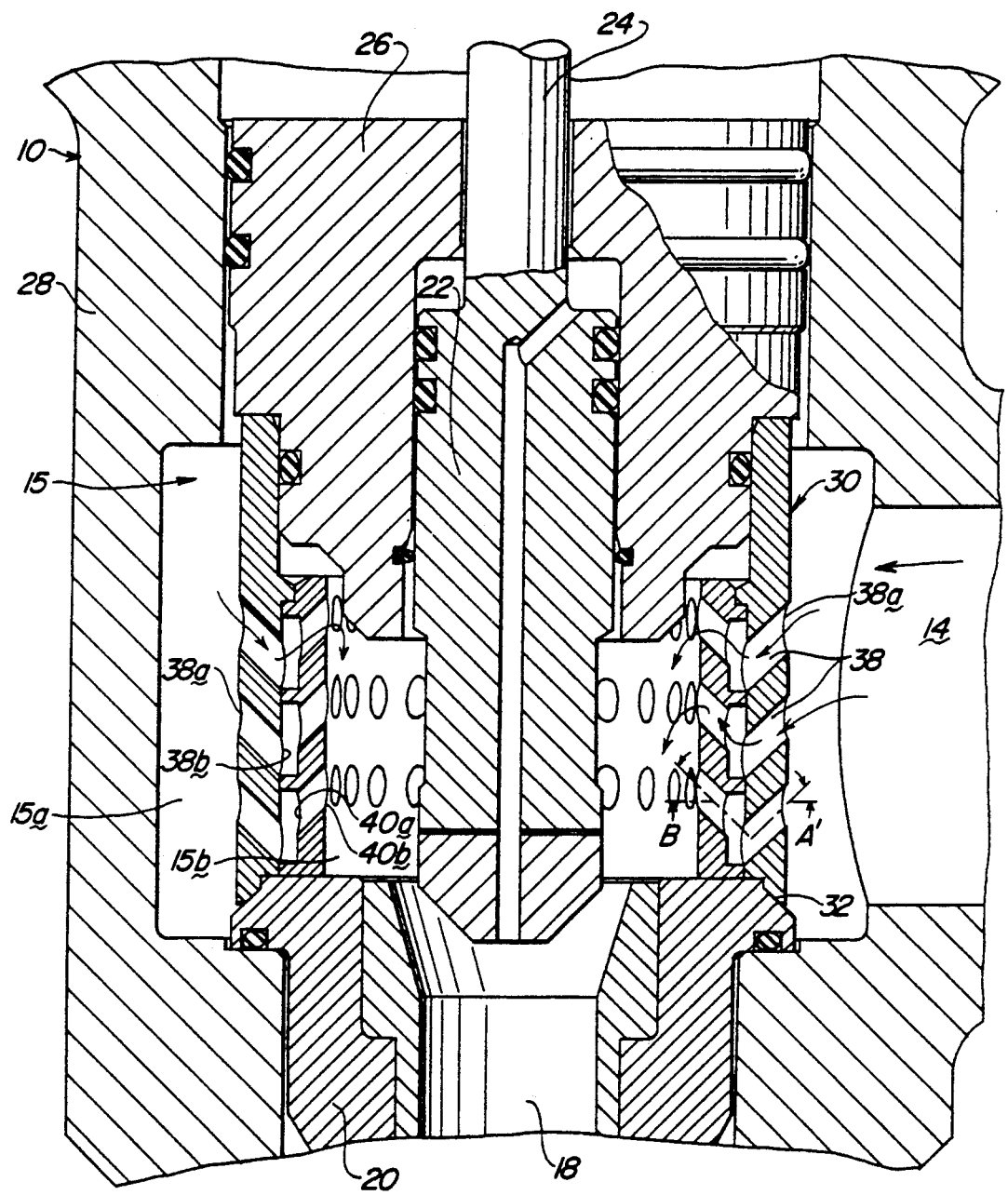
FIG. 2 is an enlarged cross sectional view of a portion of the valve shown in FIG. 1.

By referring to FIG. 2, it can be seen that the outlet passage 18 has a valve seat element 20. A valve element 22 is carried by a conventional valve stem 24. As is well known in the industry, the stem 24 is connected to a hand wheel or other means of raising and lowering the stem to selectively position the valve element 22 from a closed position in sealing contact with the valve seat 20 to positions spaced away from the valve seat 20 to control the flow therethrough. As is conventional in valves of this type, an insert 26 is positioned inside the body 28 for housing the stem 22. Insert 26 is provided with suitable sealing means and guide surfaces to properly align the valve 22 with the seat element 20.

A flow controlling assembly 30 is positioned within the valve as shown in FIG. 2 to extend between the seat element 20 and the insert 26. Assembly 30 can be constructed from a wear resistant material and can be fixed to the seat element 20 as shown at 32. The outer sleeve 34 has an internal bevel formed on the end thereof as illustrated in FIG. 2 which mates with an external beveled surface on seat element 20 to cause sleeve 34 to be axially self-aligning relative to seat element 20. Assembly 30 is shown in sealing engagement with the insert 26. As shown, a suitable seal element can be used. The particular method of mounting the assembly 30 in the flow path through the valve is immaterial. It being important only that the assembly 30 be fixed in place and be mounted such that flow does not leak between the assembly 30 and the insert 26 or seat element 20.

Figure 3:
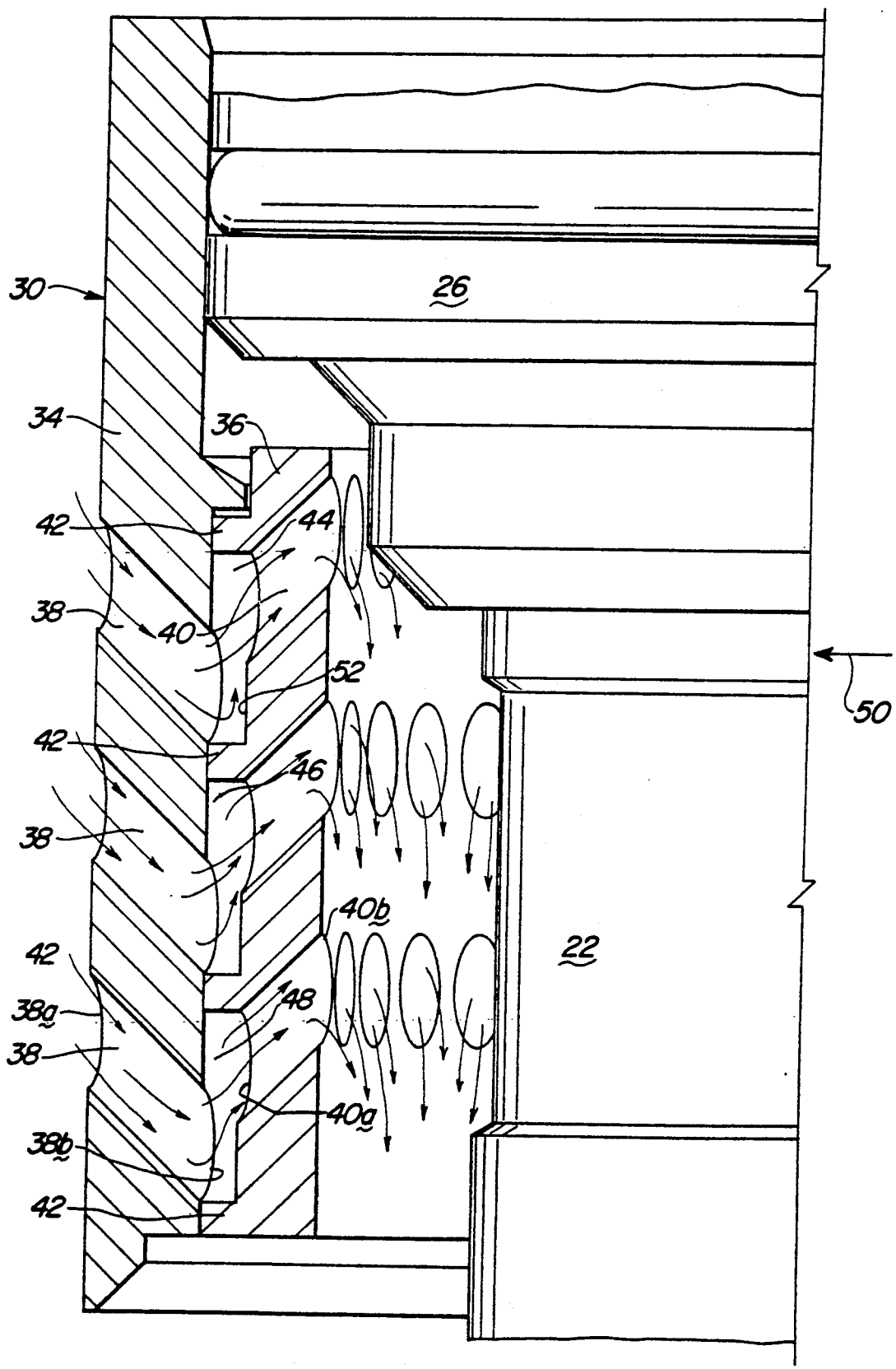
FIG. 3 is a view similar to FIG. 2, further enlarged to illustrate the flow path through the valve.

As can be seen in FIGS. 2 and 3, assembly 30 illustrated in this embodiment comprises an outer sleeve 34 and an inner sleeve 36. These sleeves are positioned in the path of fluid flowing from inlet 14 to outlet 16. Sleeves 34 and 36 are positioned concentrically around valve element 22. Outer sleeve 34 has a plurality of bores 38 extending through the sleeve to form passageways. Inner sleeve 36 likewise has a plurality of bores 40 extending through the sleeve to form passageways. Inner sleeve 36 has a plurality of annular spacers 42 formed thereon extending continuously around the exterior surface of sleeve 36. Spacers 42 contact the interior surface of sleeve 34 to form annular plenums 44, 46 and 48 between the inner and outer sleeves. In the embodiment shown in FIG. 3, three separate annular plenums are shown formed between the spacers 42. A different number of plenums could be formed as space allows. Also as is shown in FIG. 3, there are three separate sets of axially spaced bores 38 in the outer sleeve 34. The upper set of bore 38 communicates with the upper plenum 44 while the middle set of bores 38 communicate with the middle plenum 46 and the lower set of bores 38 communicate with the lower plenum 48. The annular plenums 44, 46 and 48 are separated from each other by the spacers 42. As also can be seen in FIG. 3, three separate axially spaced sets of bores 40 in inner sleeve 36 each communicate with only plenums 44, 46 and 48.

As shown in FIG. 3, the bores 38 and 40 are axially offset. The bores 40 are shown positioned slightly above the bores 38. In addition, in FIG. 3 the corresponding bores 38 and 40 are shown aligned with their centers intersecting, i.e., with their centers both in the plane of the paper. According to a particular feature of the present invention, the relative position of the sleeves 34 and 36 can be changed by relatively rotating the sleeve 36 with respect to the sleeve 34 so that the alignment of bores 38 and 40 can be changed to obtain various flow conditions. In the illustrated embodiment, the sleeves once properly aligned are held in position by contact pressure between element 20 and insert 26. It is to be understood that other means could be provided to prevent undesired relative rotation such as pins, rachet teeth or the like.

According to another particular feature of the present invention, it can be seen that the bores 38 and 40 are inclined with respect to each other and with respect to the entering flow illustrated by arrow 50. It has been found that the preferred angle of inclination, designated angle A in FIG. 2 of the drawing, of the bores 38 is 45 degrees but can be varied from zero to almost 90 degrees. The angle of inclination B of the bore 40 is preferably 45 degrees almost 90 degrees.

The flow of fluid through the flow controlling assembly 30 is shown by the small arrows in FIG. 3. As can be seen, the flow enters the valve in the direction of arrow 50 and then is forced to turn downward to flow through the bore 38. The flow, upon exiting the bore 38, impinges against the wall 52 of the annular plenum 44. The flow is forced to again radically change direction, move upward through the plenum turning outwardly and upwardly to enter port 40. Upon exiting port 40, the flow must turn downward to move toward the valve seat. It has been found that these multiple changes in direction of the flow reduces noise and erosion within the valve itself. In addition, plenums 44, 46 and 48 interconnect the axially spaced three sets of ports to permit flow both longitudinally and circumferentially as well as radially of each plenum as the fluid flows to the next array of bores. This likewise tends to reduce noise and erosion.

Figure 4:
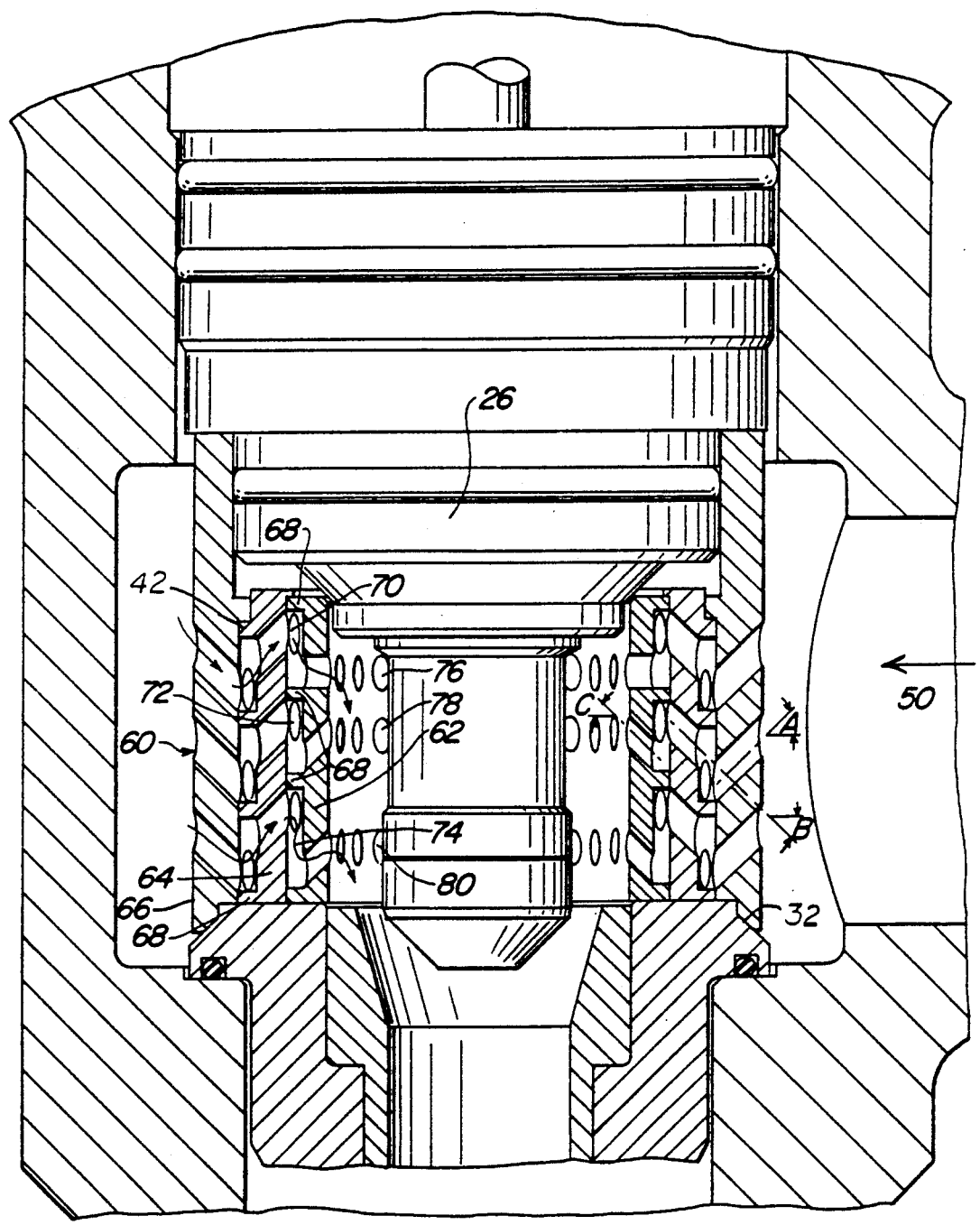
FIG. 4 is a view similar to FIG. 2 showing an alternate embodiment of the present invention.

In FIG. 4, an alternate embodiment of the present invention is shown. This embodiment comprises a flow control assembly 60 having three separate sleeves 62, 64 and 66. The outer most sleeve 66 corresponds in construction to outer sleeve 34 of the first embodiment. Intermediate sleeve 64 corresponds in construction to the inner sleeve 36 of the first embodiment.

Sleeves 64 and 66 are constructed in the manner shown in regard to the first embodiment with offset bores formed therein communicating with the separate annular plenums defined between the two sleeves.

Sleeve 62 has a plurality of annular spacers 68 defining three additional annular plenums 70, 72, and 74 between the sleeve 62 and 64. Sleeve 62 has three sets of axially spaced bores 76, 78 and 80 extending through the sleeve which act as flow passageways. As shown, the axis of bore 70 extends parallel to the flow direction 50 while the bore 78 and 80 are shown inclined in the same manner as the bores in the sleeves 64 and 66.

As can he seen in both the first and second embodiments illustrated herein, flow passing through the valve must follow a zig-zag path to pass through the sleeves. The zig-zag path in the first embodiment passes through a first set of plenums and in the second embodiment through two separate stages of plenums. Sleeves 62, 64 and 66 are also constructed such that they can be rotated circumferentially with respect to each other to vary the alignment between the bores in adjacent sleeves as required to optimize performance of the assembly 60. Embodiments using two and three separate sleeves are illustrative, however, a single sleeve or more than three could be used depending upon the space limitations and flow characteristics desired.

In FIGS. 5, 6 and 7 multiple sleeve plenum assembly of the first embodiment is shown in combination with a valve seat design. In FIG. 5, the valve element 90 is shown in an open position with the valve element 90 spaced away from the valve seat element 92 having a seating surface 93. In FIG. 7, the valve element 90 is shown in a closed position in sealing contact with the seating surface 93. According to a particular feature of the present invention the valve element 90 has a seat surface 94 which is adjacent to a first annular surface 96. As shown in FIG. 7 surface 96 is frusto-conical in shape. Adjacent to surface 96 is a second annular surface 98 which extends transverse to the center line C of the valve element 90. A third annular surface 100 is positioned between the second annular surface 98 and the pressure balancing port 102 in the valve element 90. Surface 100 is frusto-conical in shape as shown in FIG. 7.

A ring 104 is mounted in the valve seat element 92 at a position below the valve seat. Ring 104 has a flow deflecting surface 106. The deflecting surface 106 is divided into four separate segments by spaces 108 formed in the ring 106. In the illustrated embodiment four separate spaces 108 are shown, however, the size and number of these spaces could be varied to change the effects on the flow passing through the valve. The deflecting surfaces 106 and spaces 108 function together to prevent swirling and to change the direction of the flow below the valve seat. The stepped arrangement of the annular surfaces 96, 98 and 100 functions with the ring 104 and deflecting surfaces 106 to form a passageway for fluid flowing through the valve when the valve element 90 is positioned away from the valve seat element 92.

From the foregoing, it should be readily apparent that the valve construction comprises a valve body 10 having inlet 14 and outlet 18 passages communicating with a valve chamber 15. A plurality of sleeves 34 and 36 in the embodiment illustrated in FIG. 3, or sleeves 62, 64 and 66 in the embodiment illustrated in FIG. 4, each of which has cylindrical walls is mounted in valve chamber 15. The sleeves divide the valve chamber 15 to form an entrance section 15a and an outlet section 15b.

As illustrated in FIGS. 2 and 3, annular spacer rings 42 between walls of the sleeves 34 and 36 space the cylindrical wall of the outer sleeve 34 radially from the cylindrical wall of the inner sleeve 36 to form annular plenums 44, 46 and 48 between adjacent cylindrical walls of the sleeves.

As illustrated in FIG. 4, annular spacer rings 68 between walls of the sleeves 66 and 64 space the cylindrical wall of the outer sleeve 66 radially from the cylindrical wall of the intermediate sleeve 64 to form annular plenums 44, 46 and 48 between adjacent cylindrical walls of the sleeves. Annular spacer rings 68 between walls of the sleeves 64 and 62 space the cylindrical wall of the intermediate sleeve 64 radially from the cylindrical wall of the inner sleeve 62 to form annular plenums 70. 72 and 74 between adjacent cylindrical walls of the intermediate and inner sleeves.

The array of inlet bores 38 is formed in outer sleeve 34 and an array of exit bores 40 is formed in inner sleeve 36, each of the bores having an a receiving end 38a or 40a and a discharge end 38b or 40b, receiving ends 40a of bores 40 in the array of outlet bores being spaced axially of the valve chamber 15 relative to discharge ends 38b of bores 38 in the array of inlet bores. Further, it should be appreciated that bores 38 in the array of inlet bores are inclined relative to bores 40 of the array of exit bores to form a tortuous flow path from the inlet section 15a through each plenum 44, 46 and 48 to the outlet section 15b of the valve chamber 15. In addition, inlet bores 38 in the illustrated embodiment are smaller in diameter than outlet bores 40. However, bores 40 may be equal to or larger in diameter than bores 38 so long as the requisite changes in direction of flow are provided.

As hereinbefore described, the valve seat element 20 adjacent the outlet passage 18 is provided with a frusto-conical seating surface 94.

The cylindrical valve element 22, having an axially extending balancing port 102 formed therein, has a plurality of frusto-conical surfaces 94, 96 and 98 formed thereon. A first of the surfaces 94 mates with the seating surface 93 on the valve seat. A second of the surfaces 96 is inclined relative to and intersects the first surface 94. The third of the surfaces 100 is spaced from the second surface 96 and forms an annular shoulder around the balancing port 102.

The flow deflector ring 104 mounted in the outlet passage 18 has a central opening which communicates with the outlet passage and is provided with curved discontinuous deflector surfaces 106 with portions 106a extending radially into the outlet passage and transverse to the passage (as illustrated in FIG. 7) around the central opening separated by spaced grooves 108. The deflector surfaces 106 and the grooves 108 are arranged to disrupt flow of a stream of fluid flowing between the valve element 22 and the valve seat 20 to prevent the formation of a vena contracta in the outlet passage downstream from the valve seat 20. Grooves 108 reduce the tendency for the flow to swirl in the outlet and cause the direction of flow to change such that flow streams impinge upon each other to provide a significant pressure drop.

It is to be understood, of course, that the foregoing specification discloses exemplary embodiments of the present invention and that numerous modifications, alterations and changes can be made therein without departing from the spirit and scope of the invention as defined in the appended claims.

I claim:

1. A valve comprising: a valve body having inlet and outlet passages communicating with a valve chamber; flow control means in said valve chamber, said flow control means being adapted to form an entrance section and an outlet section in said valve chamber, said flow control means having an annular plenum formed therein with an array of inlet bores communicating with said entrance section of said valve chamber and said plenum and an array of exit bores communicating with said plenum said outlet section of said valve chamber, said inlet bores and said outlet bores being arranged and configured to form a tortuous flow path from said inlet section to said outlet section of said valve chamber; a valve element in said valve chamber adapted to control flow of fluid from said outlet section of said valve chamber to said outlet passage in said valve body; a valve seat adjacent said outlet passage; a seating surface on said valve seat; a flow deflector ring having a central opening in said outlet passage, said ring having discontinuous deflector surfaces around said central opening separated by spaced grooves, said deflector surfaces and said grooves being arranged to disrupt flow of a stream of fluid flowing between said valve element and said valve seat to prevent the formation of a vena contracta downstream from said valve seat.

2. A valve comprising: a valve body having inlet and outlet passages communicating with a valve chamber; valve means in said valve chamber adapted to control flow of fluid from said outlet section of said valve chamber to said outlet passage in the valve body; a valve seat adjacent said outlet passage; a seating surface on said valve seat; a flow deflector ring having a central opening in said outlet passage, said ring having discontinuous deflector surfaces around said central opening separated by spaced grooves, said deflector surfaces and said grooves being arranged to disrupt flow of a stream of fluid flowing between said valve means and said valve seat to prevent the formation of a vena contracta downstream from said valve seat.

3. A valve comprising: a valve body having inlet and outlet passages communicating with a valve chamber; flow control means in said valve chamber, said flow control means being adapted to form an entrance section and an outlet section in said chamber, said flow control means having at least one annular plenum formed therein with an array of inlet bores communicating with said entrance section of said chamber and said plenum and an array of exit bores communicating with said plenum and said outlet section of said chamber, said inlet bores and said outlet bores being arranged and configured to form a tortuous flow path from said inlet section to said outlet section of said chamber; valve means in said valve chamber adapted to control flow of fluid from said outlet section of said valve chamber to said outlet passage in the valve body; a valve seat adjacent said outlet passage; a seating surface on said valve seat; a flow deflector ring having a central opening in said outlet passage, said ring having a discontinuous deflector surfaces around said central opening separated by spaced grooves, said deflector surfaces and said grooves being arranged to disrupt flow of a stream of fluid flowing between said valve means and said valve seat to prevent the formation of a vena contracta downstream from said valve seat.

4. A valve according to claim 3, said flow control means comprising: a plurality of sleeves; spacer means on at least one of said sleeves forming said plenum between adjacent sleeves, said array of inlet bores being formed in an outer sleeve and said array of exit bores being formed in an inner sleeve of said plurality of sleeves.

5. A valve according to claim 3, said flow control means comprising: an outer sleeve and an inner sleeve; spacer means on one of said sleeves forming said plenum therebetween, said array of inlet bores being formed in said outer sleeve and said array of exit bores being formed in said inner sleeve.

6. A valve according to claim 3, said flow control means comprising: an outer sleeve, an intermediate sleeve, and an inner sleeve; spacer means on at least one of said sleeves forming as plurality of annular plenums between said sleeves, said plenums being spaced radially of said valve chamber, said array of inlet bores being formed in said outer sleeve and said array of exit bores being formed in said inner sleeve, said intermediate sleeve having an array of bores formed there in which are offset from said inlet bores and from said outlet bores.

7. A valve according to claim 3, said flow control means comprising: an outer sleeve, an intermediate sleeve, and an inner sleeve; a plurality of axially spaced spacer means on at least one of said sleeves forming as plurality of annular plenums between said sleeves, said plenums being spaced axially and radially of said valve chamber, said array of inlet bores being formed in said outer sleeve and said array of exit bores being formed in said inner sleeve, said intermediate sleeve having an array of intermediate bores formed therein, said array of intermediate bores being offset relative to said array of inlet bores and from said array of outlet bores.

8. A valve comprising: a valve body having inlet and outlet passages communicating with a valve chamber; valve in said valve chamber adapted to control flow of fluid from said outlet section of said valve chamber to said outlet passage in the valve body; a cylindrical valve element having an axially extending balancing port formed therein and a plurality of frustro-conical surfaces formed thereon; a valve seat adjacent said outlet passage; a seating surface on said valve seat; a first of said surfaces on said valve element mating with said seating surface on said valve seat, a second of said surfaces on said valve element being inclined relative to and intersecting said first surface, and a third of said surfaces on said valve element being spaced from said second surface and forming an annular shoulder around said balancing port; a flow deflector ring having a central opening in said outlet passage, said ring having discontinuous deflector surfaces around said central opening separated by spaced grooves, said deflector surfaces and said grooves being arranged to disrupt flow of a stream of fluid flowing between said valve means and said valve seat to prevent the formation of a vena contracta downstream from said valve seat.

9. The valve according to claim 2 wherein said deflector surface is located downstream from said valve seat.

10. The valve according to claim 9 wherein said deflector surface has a transversely extending portion.

11. The valve according to claim 9 wherein said deflector surface is curved.

12. The valve according to claim 9 wherein said discontinuous deflector surfaces cause flow streams through said deflector ring to change direction and to impinge upon each other.

* * * * *

UNITED STATES PATENT AND TRADEMARK OFFICE
CERTIFICATE OF CORRECTION

PATENT NO. : 5,018,703

DATED : May 28, 1991

INVENTOR(S) : William B. Goode

It is certified that error appears in the above-identified patent and that said Letters Patent is hereby corrected as shown below:

In Column 1, line 36 change "he" to -- be --

Col. 1, line 57, change "nd" to --end--

In Column 3, line 24 change "44." to -- 44, --

In Column 3, line 53 after degrees add -- also but and can be varied in a range of from zero to --

In Column 5, line 27 change "70." to -- 70, --

Signed and Sealed this

Nineteenth Day of January, 1993

*Attest:*

DOUGLAS B. COMER

*Attesting Officer*     *Acting Commissioner of Patents and Trademarks*